Patented Oct. 26, 1937

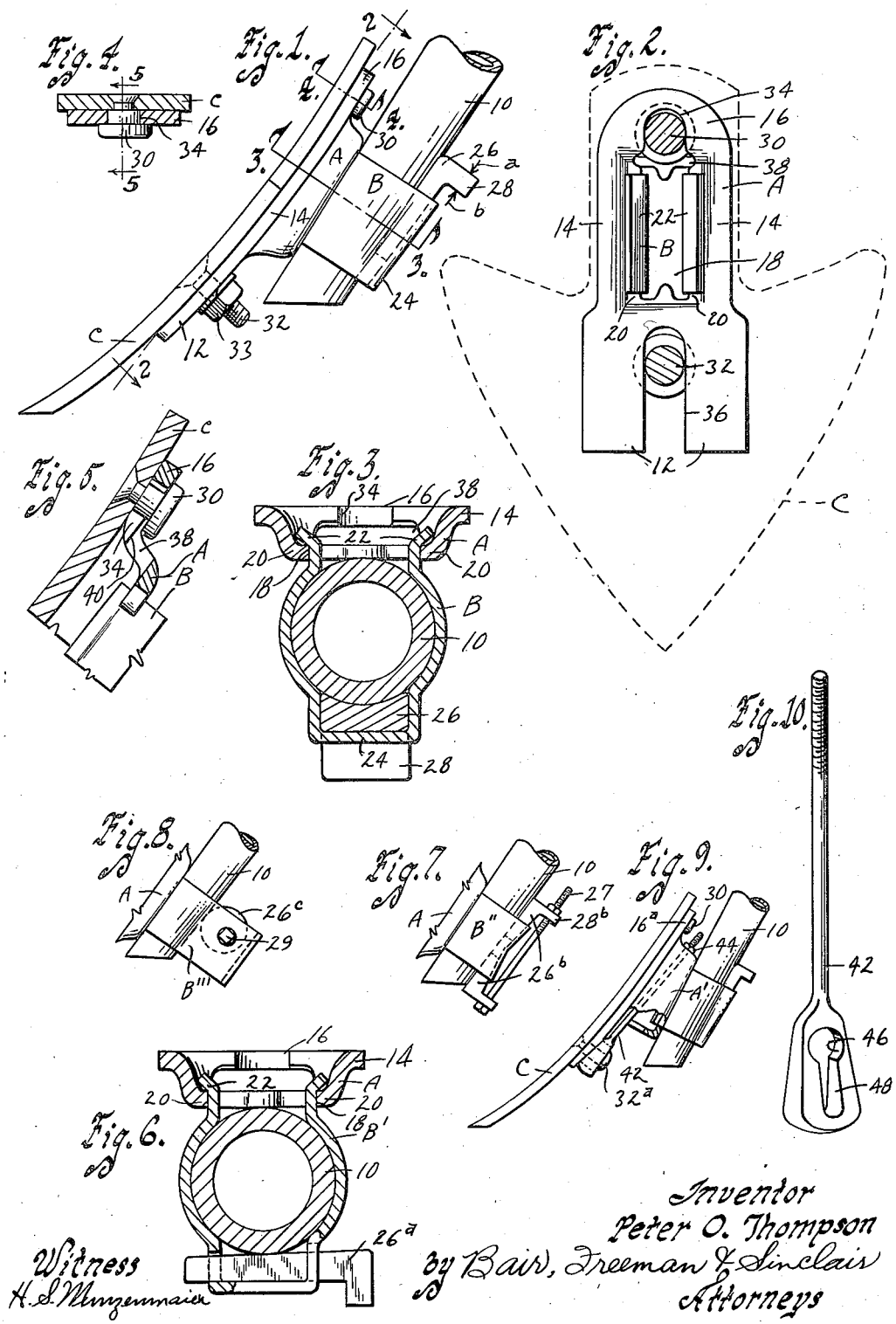

2,097,354

UNITED STATES PATENT OFFICE 2,097,354

CULTIVATOR SHOVEL STRUCTURE

Peter O. Thompson, Perry, Iowa, assignor to Osmundson Spade Manufacturing Company, Perry, Iowa Application October 14, 1935, Serial No. 44,940

10 Claims. (Cl. 97—198)

An object of my invention is to provide a cultivator shovel structure which is comparatively durable and inexpensive to manufacture and which is quickly operable for interchanging the shovels relative to an attaching bracket or removing or adjusting the bracket relative to a cultivator shank.

A further object is to provide a cultivator shovel structure in which a bracket is provided with a pair of slots and a shovel is provided with a pair of extended elements for quick coaction therewith, means being provided for clamping the shovel to the bracket after such coaction.

Another object is to provide the bracket with a pair of yokes and to provide wedge means cooperating between the pair of yokes and the cultivator shank to rigidly secure the bracket on the shank in any adjusted position relative thereto.

Another object is to provide a shovel and bracket construction having parts which so cooperate that the clamping nut of a clamping bolt can be merely loosened instead of having to be entirely removed when it is desirable to remove a cultivator shovel or place another one on the bracket.

Still another object is to provide a cultivator shovel bracket which can be made in the form of a stamping and which includes a stamped yoke having hooked ends engaging in the side edges of a slot in the bracket, thus simplifying assembly of the bracket parts, wedge means being provided which can be quickly tightened or loosened as desired by a few blows of a hammer or wrench instead of having to manipulate bolts as in the ordinary cultivator construction when it is desired to remove or adjust shovel brackets relative to the cultivator shanks.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a side elevation of a cultivator shovel structure embodying my invention.

Figure 2 is a sectional view on the line 2—2 of Figure 1 showing a front elevation of the bracket, the cultivator shovel outline being dotted to show the relation thereof to the bracket.

Figure 3 is a sectional view on the line 3—3 of Figure 1 showing a yoke and wedge associated with the bracket for tightening the bracket relative to a cultivator shank.

Figure 4 is a sectional view on the line 4—4 of Figure 1 showing the connection between the upper end of the cultivator shovel and the bracket.

Figure 5 is a sectional view on the line 5—5 of Figure 4 further illustrating this connection.

Figure 6 is a view similar to Figure 3 showing a modified construction in which a wedge member is driven transversely instead of longitudinally of the cultivator shank.

Figure 7 is a view similar to a portion of Figure 1 showing a pair of wedges tightened by a bolt instead of a single one to be tightened by hammering, as in Figure 1.

Figure 8 is a similar view showing an ordinary wedge or cam for accomplishing the bracket tightening operation.

Figure 9 is a similar view showing an eye bolt arrangement for drawing the shovel tight relative to the bracket instead of using a clamping bolt as in Figure 1; and Figure 10 is a perspective view of the eye bolt used in Figure 9.

On the accompanying drawing, I have used the reference numeral 10 to indicate a cultivator shank. I provide a bracket for attachment thereto comprising stampings A and B. The stamping A has a forward widened portion 12, a pair of side flanges 14 and a rear or top flange 16. These portions and flanges surround a centrally depressed portion having a slot 18 therein, the side edges of which are defined by flanges 20.

The member B is a yoke or band, its terminal ends being hooked as indicated at 22 to cooperate with the flanges 20.

The band B is constructed so that during the manufacturing process the hooks 22 can be inserted through the opening 18 and the band then expanded to the position of Figure 3 with the hooks engaging the flanges 20. The yoke B has an outstruck portion 24 for receiving a wedge 26. The wedge 26 has a head 28 which is useful when performing the operation of removing the wedge, as will now be described.

The yoke B encircles or partly encircles the shank 10 as best shown in Figure 3 and the wedge 26 is thereafter driven longitudinally of the cultivator shank in the direction of the arrow a (see Figure 1) for tightening the bracket relative to the shank. The bracket can be turned to any desired angle before the wedge is tightened and thus the shovel C, which is secured to the bracket portion A, can be set at any desired angle required for the work being done.

The wedge is tapered at such an angle that it will tighten the bracket relative to various sizes of cultivator shanks, it being driven in farther for smaller shanks and vice versa. When it is desired to remove the bracket from the shank, a hammer or wrench can be used to drive the wedge 26 in the direction of the arrow b by striking the head 28 of the wedge.

I provide novel means for connecting the cultivator shovel C to the bracket portion A comprising a headed element 30 secured to and projecting from the upper portion of the shovel C and a clamping bolt 32 extending through the lower portion thereof. I provide the bracket portion A with a slot 34 for the headed element 30 and a slot 36 for the bolt 32. A portion of the stamping A has an enlarged opening 38 therein to allow the head of the element 30 to pass through during the attaching and detaching operations of the shovel relative to the bracket. The under surface of the stamping A adjacent the slot 34 is cut on a taper as indicated at 40 in Figure 5, so that the farther the shovel C is pushed upwardly, the tighter the head of the element 30 will draw the shovel toward the bracket.

Providing the slots 34 and 36 necessitates merely loosening of the nut 33 on the clamping bolt 30 when it is desirable to remove the shovel from the bracket. After the nut is loosened the shovel can be shifted downwardly for disengaging the headed element 30 from the slot 34 and the bolt 32 from the slot 36.

By a reverse operation, the shovel can be replaced in a minimum of time after it is sharpened or other shovels may be substituted when it is desirable to change the cultivator from a shovel set-up for cultivating one particular product to a different set-up for another product.

After the shovel is pushed upwardly as far as the headed element 30 coacting with the tapered surface 40 will permit, the nut 33 is then tightened to secure the shovel to the bracket.

In Figure 6 I show a yoke B' formed with two sides, each of which is perforated to receive a wedge 26a driven transversely of the shank 10 instead of longitudinally thereof as in Figure 1.

By modifying the yoke B'' as shown in Figure 7 a pair of wedges 26b are used instead of the single one. The heads 28b thereof are perforated to receive a clamping bolt 27 whereby a wrench can be used for drawing the wedges together for tightening the bolt.

To loosen the wedges, the bolt 27 is loosened and the heads 28 then engaged by a hammer or wrench to drive them to a loose position.

In Figure 8 I show a modification in which the yoke B''' has a rotary wedge or cam 26c journalled between the sides of the yoke and engageable with the shank 10. An annular stub shaft 29 is provided with which a wrench can be engaged for rotating the cam 26c for tightening or loosening the bracket relative to the cultivator shank as desired.

In Figure 9 I have shown a modification which contemplates the use of an eye bolt 42 coacting with a headed element 32a which is similar to the headed element 30 and replaces the bolt 32 in Figure 1. The bracket portion A' is somewhat modified in shape so as to provide room enough between the flange 16a thereof and the cultivator shank 10 for a nut 44 to be rotated. After the shovel is placed in position with the headed elements 30 and 32a in their respective slots, the enlarged end 46 of a key hole slot in the eye bolt 42 is passed over the head of the element 32a and the eye bolt is then shifted longitudinally by the nut 44 so that the narrow portion 48 of the key hole slot will engage under the head of the element 32a. It will be noted that the lower end of the eye bolt is wedge shaped so that in drawing the shovel C upwardly, it is also drawn toward the bracket portion A'.

Changes and modifications such as I have disclosed and many others may be made without departing from the real spirit and purpose of my invention and it is my intention to cover by my claims, any modified forms of structure or use of mechanical equivalents, which may be reasonably included within their scope.

I claim as my invention:

1. In a cultivator shovel structure, a bracket, means for attaching said bracket to a cultivator shank, a cultivator shovel and means for detachably attaching said shovel to said bracket comprising a headed stud secured to said shovel and a bolt spaced therefrom and extending through the shovel, said bracket having a pair of open ended slots, one to receive said stud and the other to receive said bolt, said bolt being tightened to secure said shovel against said bracket.

2. In a cultivator shovel structure, a bracket and means for attaching said bracket to a cultivator shank comprising a band connected to the bracket and encircling the shank, a pair of wedges driven between a portion of said band and said shank, said wedges being arranged end to end with their smallest ends adjacent each other and with a space therebetween and a clamp bolt cooperating with said wedges to draw them toward each other.

3. In a cultivator shovel structure, a bracket, means for attaching said bracket to a cultivator shank, a cultivator shovel and means for detachably attaching said shovel to said bracket comprising headed members extending from one and open ended slots in the other to receive the shanks of said headed members and means to clamp said shovel to said bracket after such reception, said last means comprising an eye bolt coacting with one of said headed members.

4. In a cultivator shovel structure, a bracket, means for attaching said bracket to a cultivator shank, a cultivator shovel and means for attaching said shovel to said bracket comprising headed members extending from one and slots in the other to receive said headed members, means to clamp said shovel to said bracket after such reception, said last means comprising an eye bolt coacting with one of said headed members to move said shovel longitudinally relative to said slots when said eye bolt is tightened.

5. In a cultivator shovel structure, a bracket, means for attaching said bracket to a cultivator shank, a cultivator shovel and means for attaching said shovel to said bracket comprising headed members extending from one and slots in the other to receive said headed members, means to clamp said shovel to said bracket after such reception, said last means comprising an eye bolt coacting with one of said headed members to move said shovel longitudinally relative to said slots when said eye bolt is tightened, said eye bolt having the eye portion thereof tapered to draw said shovel against said bracket when said eye bolt is tightened.

6. In a cultivator shovel structure, a bracket, means for attaching said bracket to a cultivator shank, a cultivator shovel and means for attaching said shovel to said bracket comprising headed elements and open ended slot connections and means to tighten said shovel against said bracket after coaction of said connections, said last means comprising an eye bolt coacting with one of said headed elements.

7. In a cultivator shovel structure, a bracket, means for attaching said bracket to a cultivator shank, a cultivator shovel and means for attaching said shovel to said bracket comprising headed elements and open ended slot connections and means to tighten said shovel against said bracket after coaction of said connections, said means comprising a clamping nut, one of said headed elements being formed to receive said nut.

8. In a cultivator shovel structure, a bracket, means for attaching said bracket to a cultivator shank, a cultivator shovel and means for attaching said shovel to said bracket, headed element and slot connections, one of said slot connections being tapered to tighten said shovel against said bracket and the headed element coacting with the other slot connection including a clamping nut to also tighten said shovel against said bracket, one of said headed elements being formed to receive said nut.

9. A cultivator shovel construction comprising a bracket having a face, a pair of open ended slots therein, a shovel positioned against said face and having headed fastening elements projecting therefrom and through said slots, one of said elements being adapted for clamping the shovel to the bracket.

10. In a cultivator shovel structure, a bracket, means for attaching said bracket to a cultivator shank, a cultivator shovel and means for attaching said shovel to said bracket comprising headed members extending from one and slots in the other to receive said headed members, means to clamp said shovel to said bracket after such reception, said last means comprising a tension element to move said shovel longitudinally relative to said slots.

PETER O. THOMPSON.